(12) United States Patent
Pulter et al.

(10) Patent No.: US 7,485,801 B1
(45) Date of Patent: Feb. 3, 2009

(54) HEAT TRACE OR CONTROL CABLE SUPPORT WITH INSULATING JACKETS

(75) Inventors: Jeffrey A. Pulter, Monroe, MI (US); Jon Craig, Findlay, OH (US)

(73) Assignee: Marathon Petroleum Co., Findlay, OH (US)

( * ) Notice: Subject to any disclaimer, the term of this patent is extended or adjusted under 35 U.S.C. 154(b) by 374 days.

(21) Appl. No.: 11/371,865

(22) Filed: Mar. 8, 2006

Related U.S. Application Data

(60) Provisional application No. 60/661,272, filed on Mar. 11, 2005.

(51) Int. Cl.
*H01B 7/00* (2006.01)
(52) U.S. Cl. .................................... 174/15.2
(58) Field of Classification Search ............... 174/36; 138/149, 128, 167
See application file for complete search history.

(56) References Cited

U.S. PATENT DOCUMENTS

| | | | | |
|---|---|---|---|---|
| 2,498,442 | A | * | 2/1950 | Morey .................... 264/277 |
| 5,236,765 | A | * | 8/1993 | Cordia et al. ............ 428/192 |
| 5,883,363 | A | * | 3/1999 | Motoyoshi et al. ...... 219/529 |
| 2004/0079431 | A1 | * | 4/2004 | Kissell .................... 138/149 |

* cited by examiner

*Primary Examiner*—William H Mayo, III
(74) *Attorney, Agent, or Firm*—Emch, Schaffer, Schaub & Porcello Co., L.P.A.

(57) ABSTRACT

A structure is provided that applies support to wiring such as heat trace wiring to the joints and elbows of a marine arm allowing enough flexibility to avoid significant friction in the wiring while accommodating movement of the joints. A removable insulation blanket having internal retention members of wire positioning is wrapped around the joints of the marine arm and the wiring is looped outside the insulation blanket and over the joints to prevent unnecessary friction rubbing of the wiring due to joint movement.

6 Claims, 5 Drawing Sheets

HEAT TRACE OR CONTROL CABLE SUPPORT WITH INSULATING JACKETS

CROSS REFERENCE TO RELATED APPLICATIONS

This application claims the benefit of U.S. provisional patent application Ser. No. 60/661,272 filed Mar. 11, 2005.

BACKGROUND OF THE INVENTION

Temperature sensitive viscous products, such as asphalt are commonly transported in large quantities by barge. The product is loaded onto a barge from a land based terminal by means of a series of conduits interconnected by swivel joints and elbow joints designed to allow the conduit to be flexible enough to rise and lower as a loading dock rises and lowers based on the level of the river, while at the same time accommodating the piping extending from the terminal located on the shore. The conduit is commonly referred to as a marine arm and is segmented and jointed in such a way to allow for the vertical movement of the floating dock. The products that are either loaded or unloaded from the dock are required to be maintained at higher than ambient temperatures to promote flow of the product. In order to maintain the process temperatures, it is usually necessary to externally heat the piping and insulate it in order to decrease the amount of heat lost during the loading or unloading process. Commonly, electrical heat trace is taped to the exterior of the product pipe, providing an environmentally safe means of externally heating the pipes. The electrical heat trace is then covered with a layer of insulation to prevent heat loss and maintain the product at transportable temperatures.

Problems have been encountered in maintaining the integrity of the heat trace wiring, particularly as it is applied to the swivel joints and elbow joints which are flexing and moving as the water level rises and falls. The heat trace cables have been found to continuously sustain damage from friction and rubbing as the result of the constant movement of the joints. Other problems are encountered in that the piping and joints require annual maintenance which results in the insulation blanket being removed from the piping. Removal of the insulation blanket sometimes interferes with the integrity of the heat trace wiring adhered to the piping and causes irreversible damage to the insulation blanket.

It is an object of this invention to provide ease of maintenance of the joints and piping of the marine arms.

It is further an object of this invention to improve the integrity of the heat trace wiring around the joints and elbows of the marine arm by decreasing the wear and tear on the wiring as the marine arm flexes due to rising and lowering water levels.

It is yet another object of the invention to provide an insulating blanket that can be easily applied to and removed from the joints and elbows of the marine arm.

It is yet another object of this invention to provide support of wiring that supplies the marine arm controls.

These objects are met by the following invention.

SUMMARY OF THE INVENTION

The present invention provides a structure which applies the heat trace wiring to the joints and elbows of a marine arm while allowing enough flexibility to avoid significant friction in the wiring cable while accommodating movement of the joints. A removable insulation blanket having internal loops for heat cable positioning is wrapped around the joints of the marine arm. The insulating blanket has grommets extending through the blanket which facilitate the entrance and exit of the heat trace cable. The insulating blanket also includes a plurality of loops to support and carry the heat trace wiring thus minimizing significant frictional rubbing of the wiring. The internal loops can also be used to carry and support wiring for the loading arm controls. The insulating jacket is designed to be easily removeable while maintaining the integrity of the wiring cable connections so that sections of the marine arm can be accessed for maintenance without damaging the wiring or insulating blanket.

Other objects and advantages of the present invention will become apparent to those skilled in the art upon a review of the following detailed description of the preferred embodiments and the accompanying drawings.

DETAILED DESCRIPTION OF THE PREFERRED EMBODIMENT(S)

Figure 1:
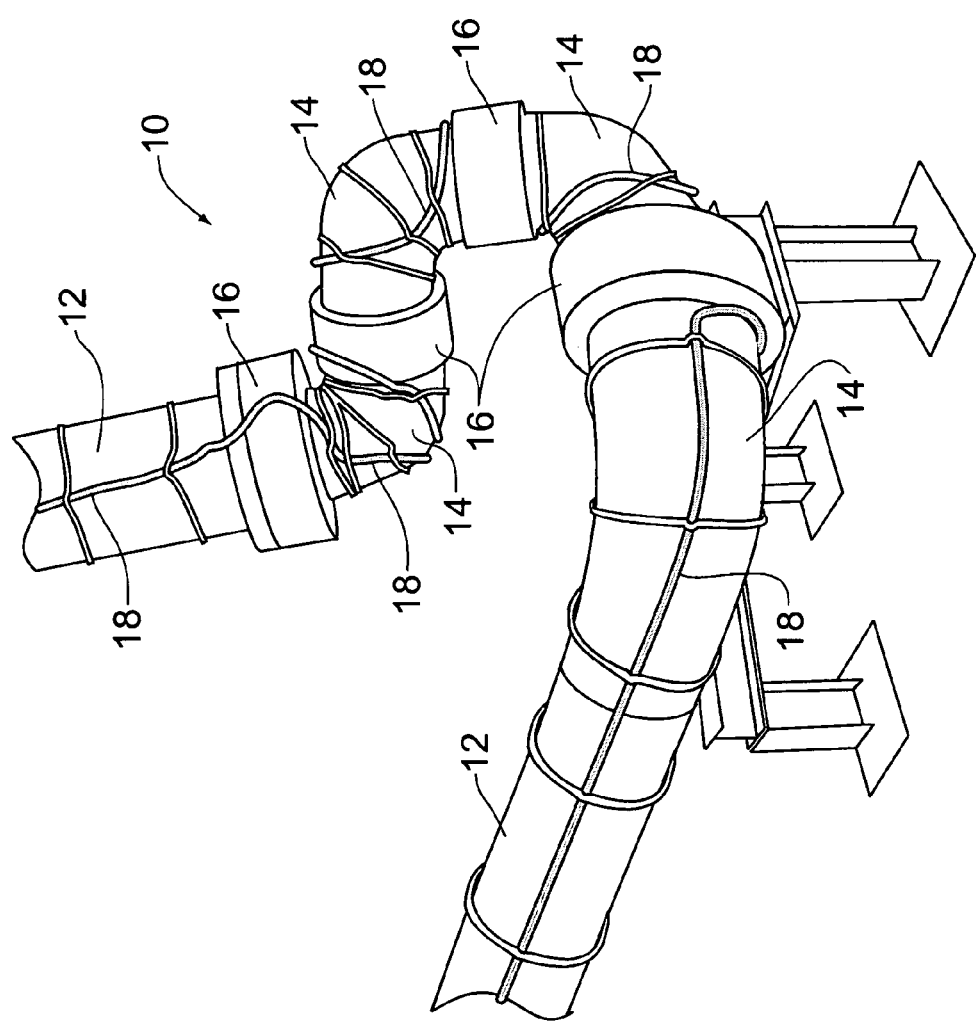
FIG. 1 is a schematic showing the prior art method of applying heat trace wiring to a marine arm.
Figure 2:
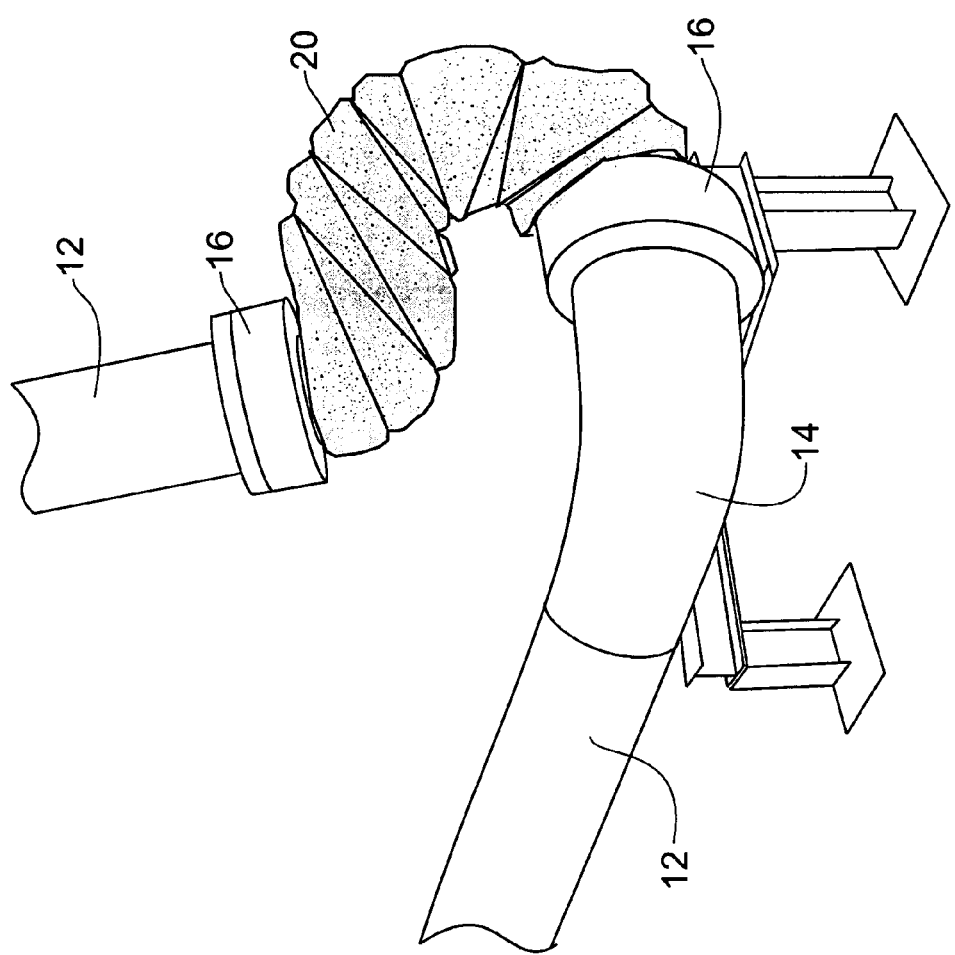
FIG. 2 is a schematic showing prior art insulating blanket applied to a marine arm.

Referring now to FIG. 1, the prior art system for applying heat trace cable to the swivel joints of marine arm is shown. A typical marine arm 10 generically illustrated in FIG. 1. The marine arm 10 includes sections of straight pipe 12 and curved pipe 14 engaged together at joints 16 that swivel, allowing for relative movement between the various pipes. Heat trace wiring 18 is taped or wired directly to the pipes and joints. It can readily be seen how relative movement between the pipes 12, 14 through the swivel joints 16 could impair the integrity of and damage the heat trace wiring. Further, referring to FIG. 2, insulation blankets 20 were placed around the pipes 12, 14 and heat trace wiring 18 to ensure warmth and proper temperature for the product moving through the pipes 12, 14. General maintenance of the pipes 12, 14 and the heat trace wiring required removal of the insulating blanket, many times destroying the blanket 20 structure.

Figure 3:
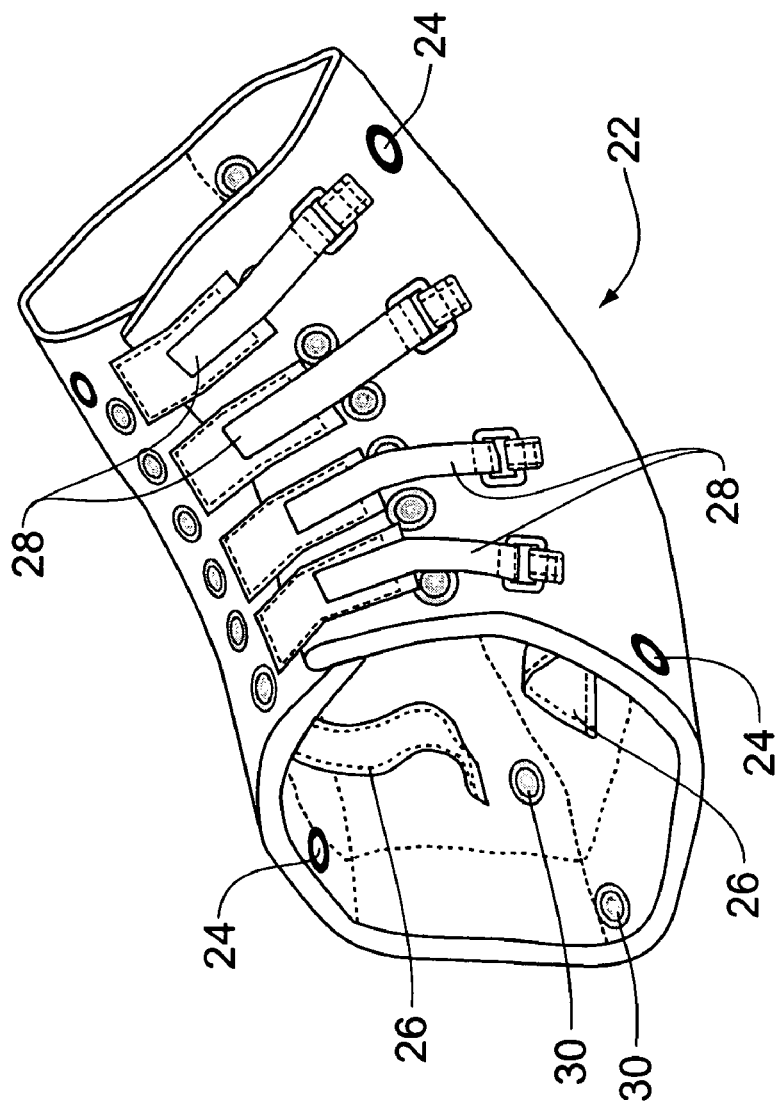
FIG. 3 shows the insulating blanket of the present invention.
Figure 4:
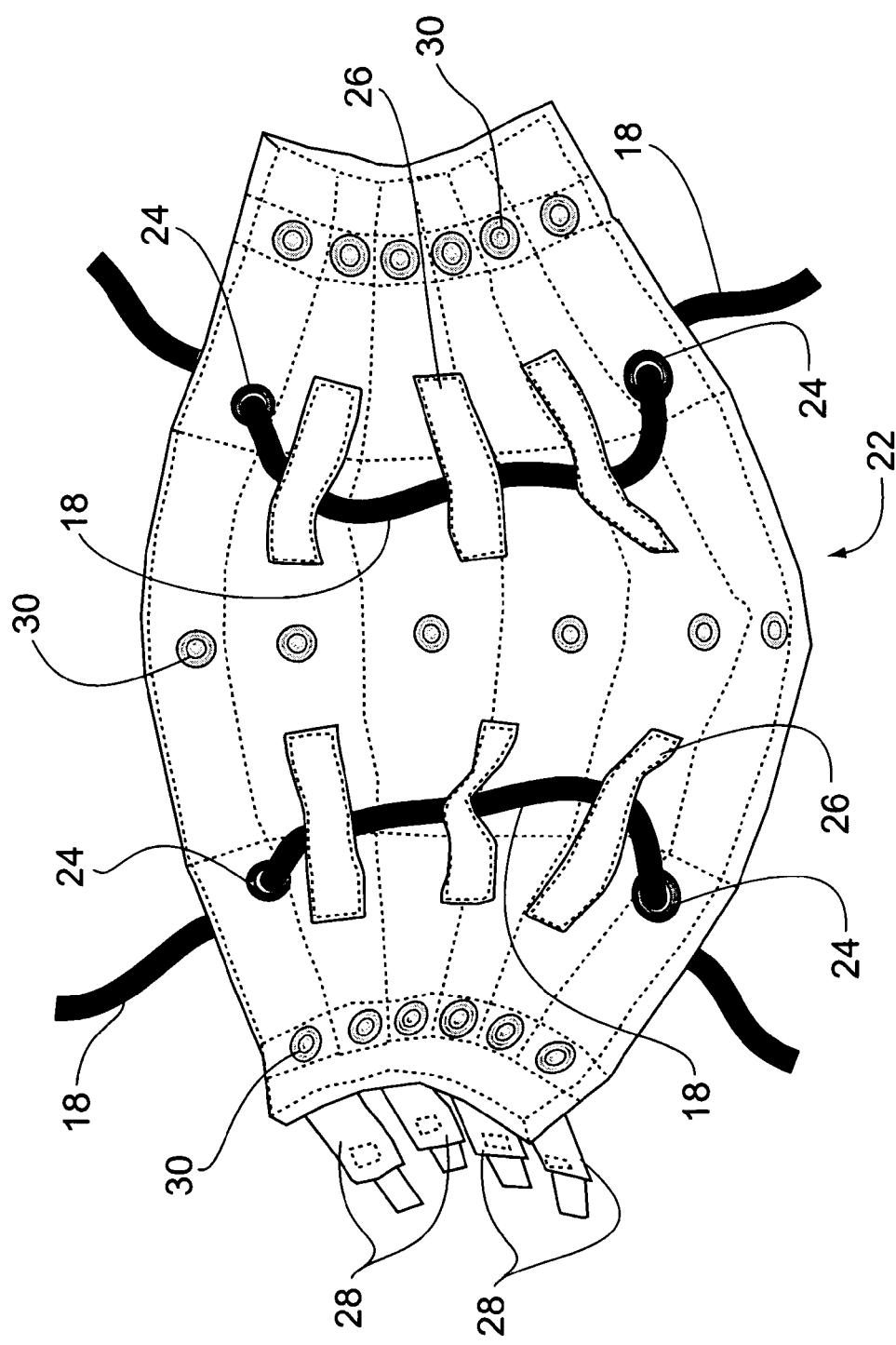
FIG. 4 shows the insulating blanket of FIG. 3 opened up to view the interior.
Figure 5:
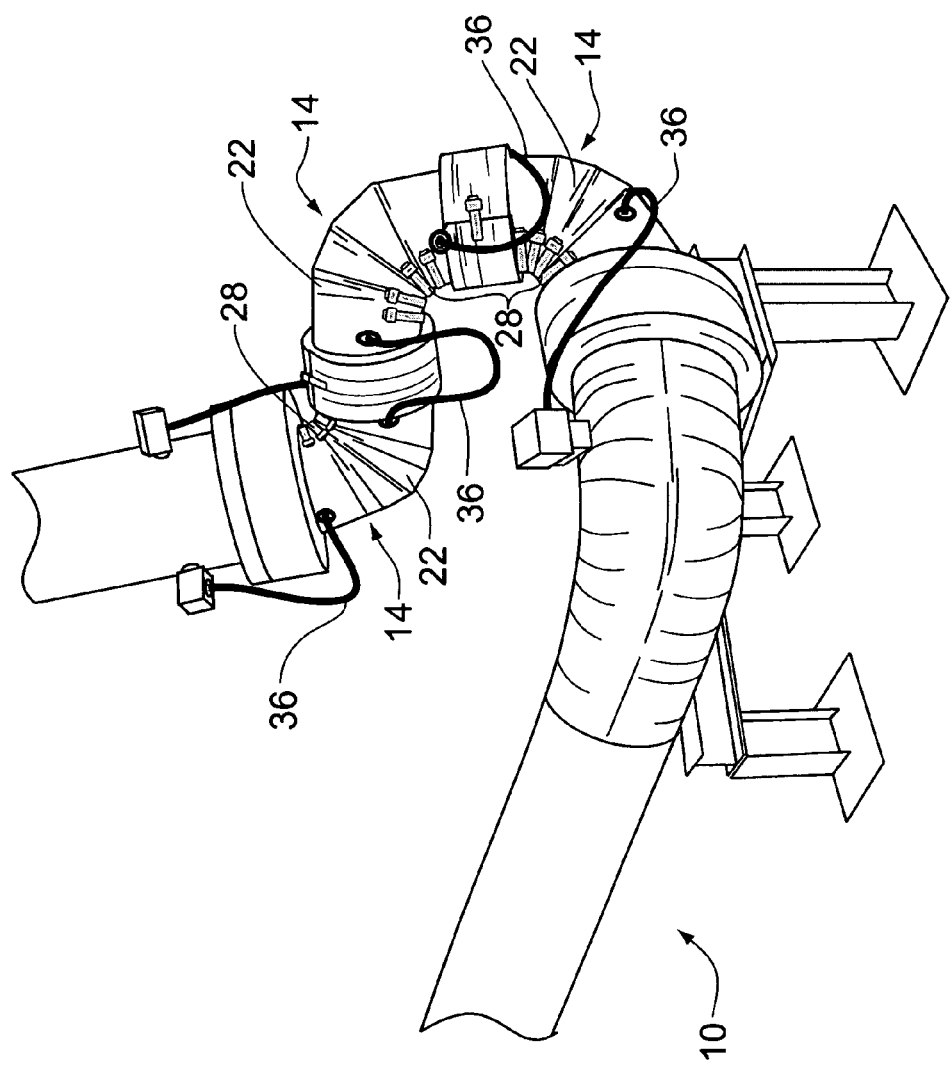
FIG. 5 is a schematic showing the insulating blanket of the present invention applied to a marine arm.

The present invention provides a unique solution to the problems identified in the prior art system. Referring now to FIGS. 3 and 4, an insulating jacket 22 is provided which is preferably composed of a silicone impregnated fiberglass insulation. The jacket 22 includes a plurality of grommets 24 extending through the jacket to allow the insertion of heat trace wiring 18. Each jacket 22 further includes a plurality of loops 26 through which the heat trace wiring 18 is threaded and retained in position. A plurality of fasteners 28, preferably Velcro, are provided to provide ease of application and removal of the insulating jacket 22 and heat trace wiring to the curved pipe 14. Referring now to FIG. 5, the marine arm 10 of FIG. 1 is shown with the invention in place. Each section of insulating jacket 22 is wrapped around a curved pipe 14 and fastened thereto by fasteners 28. Each section of insulating jacket 22 carries the heat trace wiring for positioning against the curved pipe 14. A joint jacket 32 is applied over the specific joints 16 over the marine arm 10 assembly and is fastened thereto by fastener 34. The heat trace wiring extends across the joints 16 by exiting a grommet 24 contained in a first insulating jacket and entering a grommet 24 contained in an adjacent insulating jacket. The heat trace cable is given a loop structure and is protected by a flex conduit 36 to allow for movement of the piping about the joint.

When maintenance of the piping is required, the insulating jackets may be removed simply by unfastening the fasteners and the integral unit of heat trace wiring and insulating jacket may be removed from the piping. Thus, the integrity of the heat tracing wiring system is maintained and the heat trace wire is supported with the insulating blanket to significantly reduce friction rubbing between the piping and the electrical heat trace wire. The heat trace wire looping over the joint helps support and prevent the heat trace cable from encountering tension due to marine arm movements.

It has been realized that the insulating jacket of the present invention can also be used to support the wiring for feeding load arm controls. In the same manner, the feeding load arm control wiring is threaded through the insulating jacket and supported thereby. The integrity of the control wiring is maintained regardless of movement of the marine arm.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. An insulation blanket assembly intended for use with a terminal and loading dock piping assembly wherein the piping assembly consists of straight conduit and curved conduit interconnected by joint assemblies designed to allow relative movement between the straight conduit and curved conduit, thereby accommodating vertical movement of the loading dock with respect to terminal, the insulation blanket assembly being comprised of:

insulation blanket segments designed to accommodate and wrap each portion of straight conduit and curved conduit, wherein each insulation segment is removable from its respective conduit without destroying the integrity of the insulation segment;

each insulation blanket segment having an exterior surface and an interior surface, the interior surface including retention members designed to be removably engaged with and support wiring, whereby when the insulation blanket segment is engaged with its respective conduit, the wiring is supported proximate the surface of the respective conduit;

each insulation blanket segment further including distinct wiring entrance and exit openings extending through the insulation blanket segment from the interior surface to the exterior surface wherein wiring enters the insulation blanket segment from the exterior surface, is retained on the interior surface insulation segment proximate the surface of the respective conduit and exits the insulation blanket segment, returning to the exterior surface.

2. The insulation blanket assembly of claim 1 wherein each blanket segment includes a plurality of fastener members intended to securely fasten each blanket segment about its respective conduit.

3. The insulation blanket assembly of claim 1 wherein two insulation blanket sections are located on opposing sides of a joint assembly and the wiring exits the first insulation blanket section, loops over the joint assembly and enters the adjacent second insulation blanket assembly.

4. The insulation blanket assembly of claim 1 wherein the wiring is heat trace wiring designed to apply heat to the surface of the respective conduit.

5. The insulation blanket assembly of claim 1 wherein the wiring is control wiring for the terminal and loading piping assembly controls.

6. The insulation blanket assembly of claim 1 wherein the wiring is retained in position by the retention members of each insulation blanket section and when the insulation blanket section is removed from its respective conduit, the wiring is also removed and retained in position in the retention members.

* * * * *